Jan. 7, 1936.  W. H. FARR  2,026,878
METHOD OF MAKING BRAKE DRUMS
Filed June 14, 1932

INVENTOR.
Warren H. Farr,
BY
John P. Barbor
ATTORNEY.

Patented Jan. 7, 1936

2,026,878

UNITED STATES PATENT OFFICE 2,026,878

METHOD OF MAKING BRAKE DRUMS

Warren H. Farr, Detroit, Mich., assignor to Budd Wheel Company, Philadelphia, Pa., a corporation of Pennsylvania Application June 14, 1932, Serial No. 617,090

5 Claims. (Cl. 29—152.2)

The invention relates to brake drums, and particularly to an improved method of making composite brake drums.

The prime object of the invention is the provision of a method of fabricating brake drums by a series of steps designated to improve the fabricating conditions and also the conditions under which the brake drums are required to operate. Other objects relate to improvements in detail.

I have attained the objects of my invention by changing the cross section of one of the members of a composite brake drum in order to decrease the radial yieldability which is inherent in that member during the earlier fabrication steps. This decrease in radial yieldability is just sufficient to prevent excessive expansion of this member and yet to allow sufficient expansion thereof in order that service requirements may be met.

Other objects and advantages of my invention will be apparent after a reading of the sub-joined specification, in the light of the attached drawing, in which Figure 1 is a partial elevational view of a brake drum embodying my invention.

Figure 2:
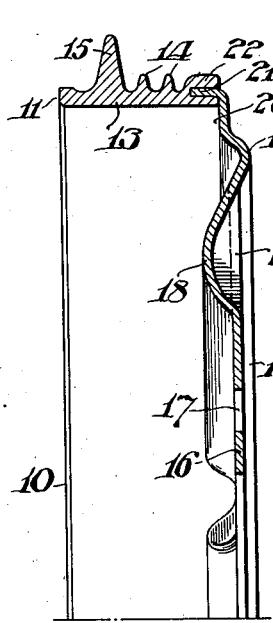
Figure 2 is a detail cross sectional view taken on line 2—2 of Figure 1.
Figure 1:
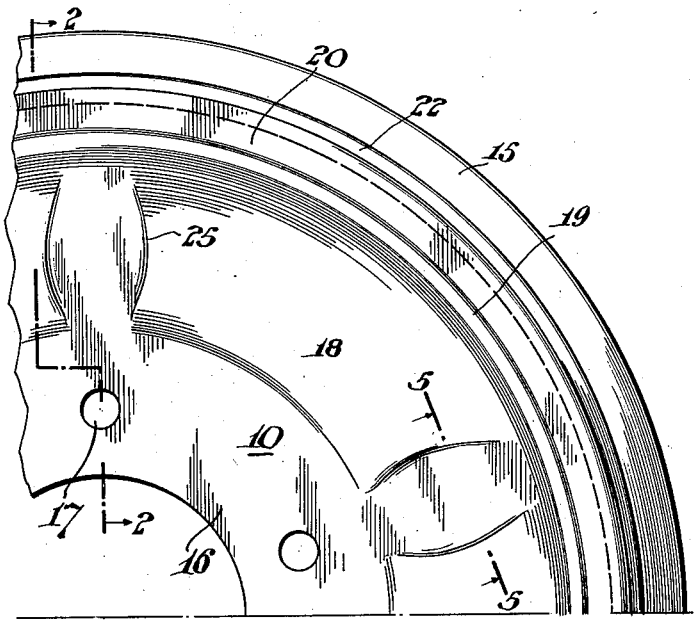
Figure 5:
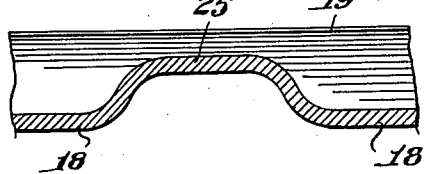
Figure 5 is a cross sectional view taken on line 5—5 of Figure 1.
Figure 3:
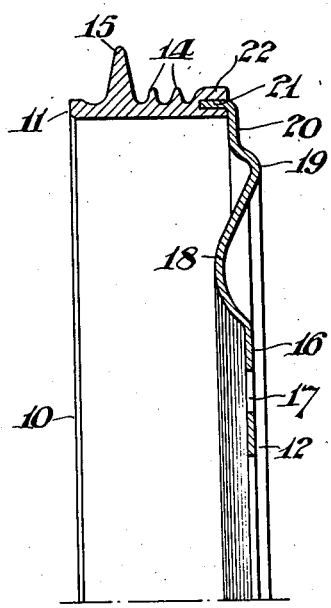
Figure 3 is a view similar to Figure 2, showing the true cross section of the drum prior to its final fabrication step.

Referring now to the drawing by reference characters, the drum 10 is of the composite type, consisting of an axially extending cast metal braking ring 11 and a radially extending pressed metal mounting plate 12. The braking ring 11 consists of a braking surface 13 on portion 11, and a series of annular cooling and strengthening ribs 14 on the exterior surface of ring 11. According to preferred drum design, I provide a main strengthening and cooling rib 15 disposed approximately ⅓ of the distance from the open to the closed end of ring 11. The mounting plate 12 consists of a central radially extending portion 16, having a series of bolt holes 17 through which the drum as a whole is secured to the usual wheel hub, not shown. Radially outwardly of this central portion I provide a fairly deep annular rib 18, the crest of which is turned axially inwardly of the drum. This annular rib terminates at its outer peripheral edge in a reversely curved ribbed portion 19, which in turn terminates in a radially extending portion 20 adjacent the outer peripheral edge of the mounting plate 12.

According to a preferred form of the invention, I provide an axially inwardly extending cylindrical flange 21 on mounting plate 12, which flange is embedded in the inner axial end 22 of cast braking ring 11 during the casting step incidental to the fabrication of the drum. Drums constructed in accordance with this method, i. e. inserting the portion of a pressed metal mounting plate into a cast ring, have been found commercially successful and it is to be understood that I make no claim in the present application to such a drum, inasmuch as my novel idea relates to the method of forming and re-striking the mounting plate 12.

Some difficulty has been encountered in the past in the fabrication of composite drums consisting of a pressed metal mounting plate, the peripheral edge of which is embedded in cast braking ring, by virtue of the fact that when the casting cools, the contraction resulting therefrom creates a strain in that portion of the casting adjacent the embedded flange of the mounting plate, or in other words, the inner axial end portion 22, due to the fact that the casting tends to contract faster than does the steel plate, inasmuch as it is cooling from a molten state, whereas the mounting plate is cooling from a low heat. This phenomenon accordingly puts the inner axial end 22 of the casting 11 under a severe strain, particularly that portion of the inner end which has flowed about the outer side of flange 21 of mounting plate 12. It will be seen that this particular portion will be put in tension, and further, that the mounting plate will be placed under a considerable degree of compression.

The most serious consequence of this phenomenon is that upon application of braking pressure, repeated or otherwise an appreciable amount of heat is developed, tending to expand the braking rings 11 outwardly, and this expansion is accentuated by the tension in the casting and the slight degree of compression in the mounting plate 12. It is, of course, undesirable to allow the braking ring 11 to expand more than a slight degree, by virtue of the fact that the brake shoes, or whatever other braking mechanisms are used will be rendered partially inoperative by such undue expansion, thus decreasing the efficiency of the brakes. While it is undesirable to allow the braking ring to expand an undue amount, it is desirable to allow the inner axial end 22 to expand slightly, in order that it may follow the normal expansion of the remainder of the braking ring 11, to prevent the phenomenon known as bell mouthing which would otherwise result if the inner axial end of the braking ring were not slightly radially yieldable.

It will be apparent from the reading of the above two paragraphs that it is desirable to provide a mounting plate 12 which will possess a sufficient degree of radial yieldability to allow it to follow the casting closely as it cools, thus avoiding the setting up of strains in the casting, and also which will be sufficiently rigid to prevent excessive expansion of the braking ring in subsequent use. This desirable feature I have sought to accomplish in the following manner, which is thought to be novel and useful in its purport.

Figure 4:
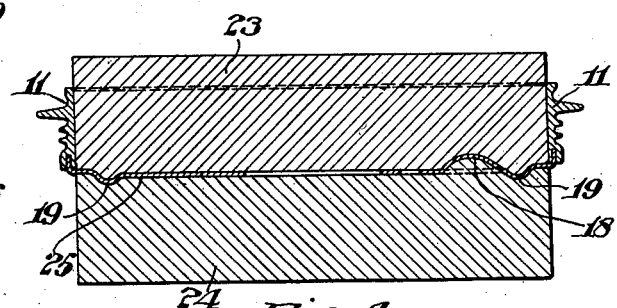
Figure 4 is a diagrammatic cross sectional view showing the manner of fabricating the drum head.

The annular ribs 14 and 15 in the mounting plate 12 allow a considerable degree of radial yieldability in the plate 12. This degree of radial yieldability is sufficient so that during the cooling of the cast braking ring 11, after the casting step, the embedded flange 21 of the mounting plate may contract easily. This provision avoids fully the setting up of tension in the inner axial ends 22 of the cast braking ring and also avoids excessive compression in the mounting plate 12, due to the natural resilience of the ribbed portions of the mounting plate. In order to relieve whatever slight degree of compression may be set up in the mounting plate 12 by contracting with the casting, and to decrease the amount of radial yieldability inherent in the plate, I prefer to place the drum as a whole in a suitable press and restrike the mounting plate, in the manner to be described. This operation is shown diagrammatically in Fig. 4, in which the upper punch is designated by numeral 23 and the die by numeral 24. This operation forms an annular series of equally spaced radially extending ribs 25, completely across annular ribs 18. This operation decreases considerably the amount of radial flexibility heretofore afforded by the annular rib 18 and also relieves the compression set up in the mounting plate 12 by contraction.

The outer annular rib 19 is unimpaired in effect and affords that desired amount of radial yieldability to the mounting plate incident to the prevention of bell mounting, without accentuating the normal expansion of the braking ring. By thus decreasing the effectiveness of one of the two annular ribs provided, I have accomplished the purposes and objects of my invention. Such a measure has materially added in the fabrication of brake drums, and has also rendered them more satisfactory in use.

The invention is novel, and is characterized by its simplicity and general utility. Modifications of the invention will be apparent to those skilled in the art, and the appended claims therefore should be read with a breadth of understanding commensurate with the generic spirit of my invention.

What I claim is:

1. The method of making brake drums which consists in inserting a portion of a radially yieldable backing plate into a mold, casting a braking ring in said mold about said backing plate portion, cooling the casting, and thereafter forming ribs in said backing plate to stiffen the same against further radial yielding.

2. The method of making composite brake drums which consists in imbedding a radially yieldable mounting plate in a braking ring during the casting of such ring, and thereafter forming struck-up portions in said mounting plate to resist further radial yielding after the casting has cooled and contracted.

3. The method of making composite brake drums which consists in imbedding a radially yieldable mounting plate in a braking ring during the casting of such ring, and thereafter restriking said mounting plate to resist further radial yielding after the casting has cooled and contracted.

4. The method of making composite brake drums which consists in imbedding a radially yieldable mounting plate in a braking ring during the casting of such ring, and thereafter forming radially extending ribs in said mounting plate to resist further radial yielding after the casting has cooled and contracted.

5. The method of making composite brake drums which consists in casting a braking surface onto the outer periphery of an annularly ribbed mounting plate, and thereafter forming spaced radial ribs across at least one of said annular ribs.

WARREN H. FARR.